United States Patent Office 3,755,550
Patented Aug. 28, 1973

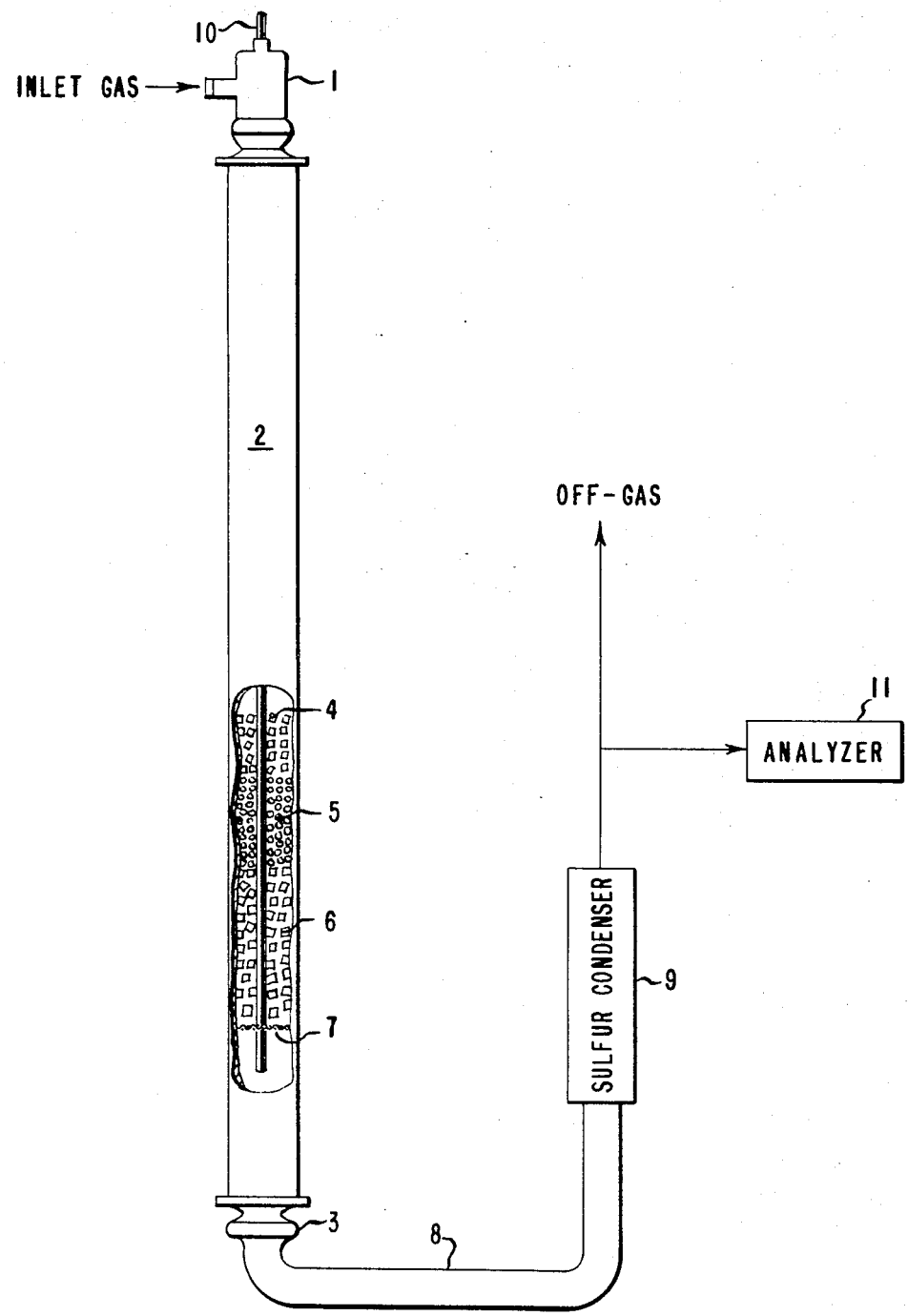

3,755,550
PROCESS FOR REDUCTION OF SO₂
Alvin B. Stiles, Wilmington, Del., assignor to E. I. du Pont de Nemours and Company, Wilmington, Del.
Continuation-in-part of abandoned application Ser. No. 818,027, Apr. 21, 1969. This application Aug. 2, 1971, Ser. No. 168,351
Int. Cl. C01b *17/16*
U.S. Cl. 423—564                                      5 Claims

ABSTRACT OF THE DISCLOSURE

This invention relates to the initial catalytic reduction of sulfur dioxide to hydrogen sulfide with a reducing gas wherein the catalytic material is on a support and the material is a combination of (1) alkaline earth molybdates and (2) a chromite selected from the group of the chromites of cobalt, manganese, copper, cerium, or a mixture of the rare earths containing at least 30% cerium. Space velocities of at least 500 up to over 4000 hr.$^{-1}$ at light-off temperatures of less than 540° C. with the gases reaching equilibrium are practical.

REFERENCE TO RELATED APPLICATIONS

This application is a continuation-in-part application of my copending U.S. Ser. No. 818,027, filed Apr. 21, 1969, now abandoned.

BACKGROUND OF THE INVENTION

This invention relates to a process for the reduction of sulfur dioxide to hydrogen sulfide. The reduction of sulfur dioxide using reducing gases to ultimately produce elemental sulfur therefrom is known to the art.

In recent years much work has been done to develop technology for the efficient conversion of sulfur dioxide to sulfur. This stems from the need for the elimination of this contaminant from our environment. This is also a result of the increased price of elemental sulfur, for the value of this otherwise wasted sulfur can be expected to offset, to a great extent, the cost of efforts at eliminating sulfur dioxide as an environmental contaminant. In addition, as elemental sulfur is being rapidly depleted as a world resource the process of this invention provides a method for the conservation of sulfur now wasted with the added benefit that the reducing gas employed in the process is efficiently utilized.

An especially pertinent patent in the field is U.S. Pat. 3,199,955 issued to James R. West and Edward H. Conroy on Aug. 10, 1965.

The West and Conroy patent discloses that a reaction between a gaseous hydrocarbon and sulfur dioxide may be effected with an alumina catalyst at a temperature as low as 750° C.

This invention provides catalytic compositions which produce increased efficiency in effecting the reduction of sulfur dioxide with a reactive reducing gas as alumina alone is not acceptable as a catalyst because of its lack of effectiveness for activating carbon monoxide in the reducing gas.

U.S. Pat. 3,495,941, dated Feb. 17, 1970 (to Van Helden) discloses a process for the initial reduction of SO₂ to hydrogen sulfide by contacting a gaseous mixture containing SO₂ with a reducing gas in the presence of a catalyst containing a vanadium oxide supported on a carrier. Van Helden teaches the attainment of space velocities of between 100 and 2000 volumes of gaseous mixture per volume of catalyst per hour at a temperature within the range of about 300° C. to 600° C. However, the vanadium oxide catalyst is shown to be relatively inactive despite the fact that useful temperatures of 300 to 600° C. are provided for. These low temperatures are attained only at the expense of using an excess of methane reducing gas of at least 100% and as much as 1000% when attaining the lower temperatures. The high cost of excess methane (methane and natural gas are becoming sharply more expensive as the depletion date of 1985 for known reserves approaches) makes this a particularly unattractive procedure when dealing with large quantities of SO₂ containing gases and far outweighs any benefit gained by operating at lower temperatures. The procedure as defined by applicant in his claims offers the advantages of operating at low temperatures, high space velocities, and with a gas quantity essentially stoichiometrically equivalent to that necessary for the reduction of the SO₂.

Van Helden further points out in his discussion of the prior art that the prior art cobalt molybdate catalyst system provides a low space velocity of only 50 to 500 hr.$^{-1}$ at temperatures of 593 to 705° C. In applicant's process one of the essential catalytic components is an alkaline earth molybdate.

The complete and efficient utilization of the reducing gas, according to the present invention, will enable industry to eliminate sulfur dioxide wastes with greater economy than has heretofore been known to the art.

SUMMARY OF INVENTION

The invention in its broader aspects is defined as in a process of reducing sulfur dioxide including the steps of forming a reactant gas stream comprising the sulfur dioxide and a reducing gas selected from the group consisting of reformed methane, propane, refinery waste gas, liquified petroleum gas or steam reformed naphtha and then bringing this reactant gas stream into contact with a supported catalyst; the improvement for providing substantially complete utilization of the reducing gas with more efficient reduction of the sulfur dioxide at practical space velocities and temperatures, which comprises contacting the reactant gas stream with an effective amount of a catalytic material on a support in which the catalytic material is a mixture of the following two components:

(1) alkaline earth molybdates
(2) a chromite selected from the group consisting of the chromite of cobalt, manganese, copper, cerium or a mixture of the rare earths containing at least 30% of cerium, at a space velocity of at least 500 hr.$^{-1}$ and at a light-off temperature of less than 540° C.

It is preferred that the catalytic material be present in an amount of from 0.02 to 50 parts by weight for each part by weight of support material. The preferred support material is alumina and more preferably kappa-alumina. The most preferred catalytic material is a mixture of calcium molybdate and cobalt chromite.

The term "chromates" indicates that the Cr is in the valence state of 6 whereas "chromite" indicates the Cr is in the valence state of 3.

The process improvement in this invention relates to the initial conversion of sulfur dioxide to hydrogen sulfide in a multistep process for the overall conversion of sulfur containing gases to elemental sulfur. It is well known in the art that once the SO₂ is converted to hydrogen sulfide that the hydrogen sulfide is then slightly reactive with additional SO₂ to provide elemental sulfur (the Klaus reaction).

The most preferred catalytic material is comprised of from 0.001:1 to 100:1 parts by weight of calcium molybdate to cobalt chromite. In these catalysts the atomic ratio of calcium to molybdenum can range from 0.5:1 to 3:1 with a ratio of 1:1 being preferred; and the atomic ratio of cobalt to chromium can range from 0.5:1 to 3:1 with a ratio of 1:1 being preferred.

The catalysts of this invention will have a surface area of from about 10 m.$^2$/g. to 200 m.$^2$/g.

DETAILED DESCRIPTION OF THE INVENTION

The catalytic composition of this invention enable the more economic removal of sulfur dioxide-containing gases from effluent gases produced as a result of many different types of commercial and industrial operations. Such effluent gas streams usually contain gaseous components such as nitrogen, oxygen, water, and carbon dioxide in addition to sulfur dioxide. The sulfur dioxide can be present in an amount of from 1% or less of the effluent stream to 95% or higher of the effluent stream.

It will be understood that the effluent stream is generally freed from dust and other suspended solids prior to the reaction with the reducing gas in the catalyst bed.

It will be understood that the term reducing gas as employed herein refers to a reactive gas containing from 0–100% of hydrogen and/or from 0–100% olefins. The reactive gases are those which oxidize readily and would be considered by the petroleum industry as those with low octane ratings. The reducing gas ordinarily is selected from the group consisting of reformed methane (CO+H$_2$), propane, LPG (commercial mixture of propane and butane) and steam reformed naphtha.

The attached figure illustrates a reactor for carrying out the invention.

The sulfur dioxide-containing gas stream is mixed with a measured amount of reducing gas and is introduced at inlet port 1 as the inlet gas, and passes into converter tube 2. The length of converter tube 2 is fifteen times the internal diameter. The tube contains an inlet port 1, at one end and an exit port 3, at the other end. As the reactor gas stream passes into the converter tube it first encounters a layer of quartz packing, 4. The gas passes through the bed of quartz packing, 4, and across the catalyst bed, 5, and then across a second bed of quartz packing 6. The quartz packing and catalyst material are supported on a stainless steel screen, 7. After passing across the quartz packing and catalyst material the now converted gas stream passes out exit port, 3, into exit line 8. The gaseous mixture passes through exit line, 8 into sulfur condenser, 9, where the elemental sulfur formed in the converter tube is removed and the off-gas passes into analyzer 11.

The off-gas stream is monitored after passage through the sulfur condenser in analyzer 11 to insure that the reactor temperature is adjusted so that essentially all of the reducing gas is utilized in reducing the SO$_2$ to H$_2$S and that SO$_2$ has been lowered to the equilibrium value.

To fully realize the valuable contribution of this invention to the art, it must be appreciated that a process for the elimination of sulfur dioxide from effluent waste gases would of necessity be required to purify large volumes of gas in an efficient manner. Therefore, considerations such as the space velocity of the gas stream, temperature, volume percent of reactants in the gaseous phase, ratio of reactants and conversion rate of the catalyst are relevant factors to be considered in the evaluation of a given process as a feasible method for the elimination of pollution from the waste gas.

The process of this invention can accommodate a space velocity of from ten to for thousand or more volumes of reactant gas (at standard temperature and pressure) per hour per volume of catalyst. It will be understood that the term reactant gas is used to identify the mixture of a gas containing SO$_2$ and a reducing gas as defined above. The process of this invention can be used to economically reduce the SO$_2$ to equilibrium value in a waste gas at a light-off temperature of from about 380° C. to 750° C. The preferred light-off temperature is less than 540° C.

It should be understood that in the reduction of SO$_2$ ultimately to elemental sulfur the difficult and uneconomical portion of the prior art processes resides in the initial reduction of SO$_2$ to H$_2$S. Once H$_2$S is produced then this H$_2$S is highly reactive with SO$_2$ to provide elemental sulfur. In the examples that follow the SO$_2$ concentration is measured before and after treatment. The SO$_2$ has mainly been converted in the examples to H$_2$S which is wherein the process improvement primarily resides. The maximum reduction of SO$_2$ that can occur for a given set of conditions is that corresponding to equilibrium.

This invention will be more fully understood by reference to the following illustrative examples.

EXAMPLE 1

The catalyst of this example is prepared by first making a solution comprising 35.5 parts by weight of ammonium molybdate in (NH$_4$)$_6$MO$_7$O$_{24}$·4H$_2$O in sufficient distilled water to produce 500 parts by weight of solution. A second solution is prepared comprising 47.0 parts by weight of calcium nitrate quadrahydrate and sufficient distilled water to produce 500 parts by weight of solution. With both solutions at 35° C. and the ammonium molybdate solution being rapidly agitated, the calcium nitrate solution is added over a period of 5 minutes. After agitating for 30 minutes at 35° C., the slurry is filtered and washed with 1000 parts by weight of distilled water. The entire filter cake thus produced containing calcium molybdate is added to the ball mill charge as subsequently described.

A solution is prepared comprising 58 parts by weight of cobalt nitrate hexahydrate and 20 parts by weight of chromic acid anhydride in sufficient distilled water to produce 500 parts by weight of solution. With this solution at 35° C., 28% ammonium hydroxide is added to increase the pH to 6.7 and thus effect the precipitation of basic cobalt chromate. The basic cobalt chromate on subsequent calcining decomposes to cobalt-chromate. The slurry thus produced is agitated for 30 minutes, is filtered and is washed with 1000 parts by weight of distilled water.

Kappa-aluminum oxide for use as a support material is prepared by calcining at 600° C. for 3 hours alumina hydrate derived as a by-product from the hydrolysis of aluminum alkyls.

A ball mill charge is made comprising 1000 parts by weight of the kappa-alumina. There is also added to the ball mill 750 parts by weight of distilled water and 100 parts by weight of 70% nitric acid. The mill is rotated for 2 hours, is opened and the filter cakes obtained in the above paragraphs comprising the calcium molybdate and basic cobalt chromates are added and the mill is rotated for 18 hours. The mill product is dried at 150° C., and is calcined at 600° C. for 3 hours. The calcined material is then crushed and screened through 8–12 mesh. The surface area of this material is 150 m.$^2$/g. The cobalt chromate decomposes to cobalt chromite during the calcining.

130 volumes of the 8–12 mesh granules of the catalyst thus produced is placed in the test converter as shown in the attached figure. The converter comprises a tube having a length 15 times the internal diameter. The tube is closed at both ends with the exception of an inlet port at the top and an L-shaped exit port at the bottom. Connected to the inlet port is an inlet gas line through which is passed quantities of gas totaling 5400 volumes/min. and comprising 0.08% CH$_4$, 3.3% CO, 0.6% CO$_2$, 12.32% H$_2$, 23.65% H$_2$O, 52.23% N$_2$, 0.30% O$_2$, and 7.51% SO$_2$. This volume of gas and catalyst is equivalent to a space velocity of 2500 hr.$^{-1}$.

The exit gas line permits the exit gases to be passed through a condenser for the removal of the elemental sulfur formed in the converter and then into an F & M Model 500 gas chromatograph where residual unreacted hydrogen, SO$_2$ and carbon monoxide are measured. The converter tube is heated by means of a split tube furnace capable of heating the incoming gases to a level as high as 1100° C. An internal thermocouple well permits the exploration of the axial temperature levels throughout the length of the reactor tube.

With the gas flow at the level stipulated above and the catalyst composition also as stipulated, the hot spot temperature in the reactor is held at about 780° C. for 3 hours and is then lowered in 50° C. increments. The off-gas is sampled at each stage after the temperature has stabilized. With the gas of the example, the unreacted hydrogen in the elemental sulfur-free off-gas is reduced to less than 0.25% at a hot spot temperature of 585° C. and a light-off temperature of 385° C.

It should be pointed out, however, that at temperatures in excess of 800° C. the hydrogen level in the off-gas will exceed 0.25% but this is because thermodynamic equilibrium considerations require that hydrogen level exceed the 0.25% value at these elevated temperatures.

EXAMPLE 2

The catalyst of Example 1 is modified to the extent that instead of using 8–12 mesh granules the size of the granules is increased 3–5 mesh. The surface area of this material is 150 m.$^2$/g. When this size catalyst is examined under the conditions described for Example 1, the temperature at which either less than 0.25% or equilibrium hydrogen leakage is achieved in the off-gas is at hot spot temperatures equal to or exceeding 645° C. with a light-off temperature of 445° C. At 645° C. the $SO_2$ level in the elemental sulfur-free off-gas is about 2.26% which is equilibrium value.

EXAMPLE 3

Instead of the granular catalyst described in Examples 1 and 2 pills of $3/16''$ x $3/16''$ size pilled with 1% graphite are examined in the test equipment and under the conditions described in Example 1. The hot spot temperature at which the hydrogen content is less than 0.25% in the off-gas is achieved at 660° C. with a light-off temperature of the catalyst being 460° C. At 660° C. the $SO_2$ level in the off-gas is about 2.2% (equilibrium).

The catalyst described in Example 1 is modified by increasing the cobalt-chromite content by 100% and formed into granules having a particle size of 8–12 mesh according to the method described above. This material has a surface area of 162 m.$^2$/g. This catalyst is similarly examined and the hot spot temperature at which either less than 0.25% or equilibrium hydrogen leakage is achieved is 575° C. (or above) which corresponds to a light-off temperature of 375° C. At 575° C. the $SO_2$ level in the off-gas is about 2.4% (equilibrium).

EXAMPLE 4

The catalyst described in Example 1 is modified by increasing the cobalt-chromite content by 200%, particle size is 8–12 mesh and surface area is 164 m.$^2$/g. The composition gives hydrogen utilization such that less than 0.25% or equilibrium $H_2$ is attained in the off-gas at hot spot temperatures equal to (or exeeding) 575° C. corresponding to a light-off temperature of 375° C. The $SO_2$ level in the elemental sulfur-free off-gas was comparable to that observed in Example 3.

EXAMPLE 5

The catalyst described in Example 1 is modified by using only one-half of the quantity of cobalt-chromite (the product derived from calcined basic cobalt chromate) in preparing the catalyst; particle size is 8–12 mesh and surface area is 145 m.$^2$/g. The hot spot temperature at which the hydrogen level is below 0.25% or at equilibrium in the off-gas is 585° C. (light-off temperature 385° C.) or above within the limitations of equilibrium considerations. The $SO_2$ level in the off-gas is about 2.3% and thus has attained equilibrium.

EXAMPLE 6

The catalyst described in Example 1 is modified by using only one-half the quantity of calcium molybdate in preparing the catalyst; particle size is 8–12 mesh and the surface area is 150 m.$^2$/g. When the catalyst is examined under the above-described test conditions, the hydrogen content in the off-gas is either equal to equilibrium or below 0.25% at hot spot temperatures equal to or exceeding 605° C., corresponding to a light-off temperature of 405° C. The $SO_2$ level in the off-gas is about 2.3%, equilibrium.

EXAMPLE 7

The catalyst described in Example 1 is modified by using twice the quantity of calcium molybdate in preparing the catalyst composition; particle size is 8–12 mesh and surface area is 155 m.$^2$/g. When the catalyst is examined under the above described test conditions, the hydrogen leakage in the off-gas, which contains 2.4% $SO_2$ (equilibrium), is also at equilibrium or below 0.25% at hot spot temperatures exceeding 575° C. The light-off temperature is 375° C.

EXAMPLE 8

The catalyst described in Example 1 is modified by using three times the quantity of calcium-molybdate in preparing the catalyst composition; particle size is 8–12 mesh and surface area is 155 m.$^2$/g. When the catalyst is examined under the test conditions of Example 1 the $SO_2$ is removed to equilibrium which is about a 2.4% level and the hydrogen leakage in the off-gas is also at equilibrium or below 0.25% at hot spot temperatures equal to or exceeding 565° C.; light-off temperature is 365° C.

The catalyst described in Example 1 can be modified by substituting stoichiometric quantities of either magnesium nitrate, strontium nitrate or barium nitrate for the calcium component of the original catalyst to give a product having similar surface area and catalytic properties.

Similarly magnesium oxide, thorium oxide, silica, titania, zirconia and mixtures thereof can be substituted for the alumina support material in preparing the catalyst. When a source of these materials such as the nitrate, gel, sol or other form known to the art is used, a satisfactory catalyst having a surface area in excess of 10 m.$^2$/g. can be prepared.

EXAMPLE 9

The catalyst of Example 1 is examined utilizing reducing gases other than that of Example 1, for reducing sulfur dioxide. The following results are observed:

(a) A stoichiometric quantity of propane is substituted for the hydrogen and carbon monoxide in the gas stream as described in Example 1. When the propane is used a hot spot temperature of 710° C. and a light-off temperature of 510° C. is adequate to reach equilibrium or to attain levels of hydrogen in the off-gas below 0.25%. At a hot spot temperature of 710° C. the $SO_2$ level in the off-gas is about 2.2% which is equilibrium with other gaseous compounds.

(b) When a stoichiometric quantity of refinery waste gas comprised of about 50% hydrogen with unsaturated hydrocarbons comprising most of the remainder of the gas is substituted for the hydrogen and carbon monoxide in the gas stream of Example 1, the temperature at which either equilibrium or less than 0.25% hydrogen concentration is reached in the off-gas is at a light-off temperature of 410° C. and at hot spot temperature of 610° C. or above. At a hot spot temperature of 610° C. the $SO_2$ concentration in the elemental sulfur-free off-gas is at equilibrium about 2.3%.

(c) When a stoichiometric quantity of steam reformed naphtha is substituted for the hydrogen and carbon monoxide in the gas stream of Example 1, a light-off temperature of 400° C. and a 600° C. hot spot temperature are adequate to achieve the $SO_2$ reduction (to about equilibrium level) and the efficiency of utilization of the gas hereinbefore described.

With the catalyst of Example 1 being installed in the test equipment, the space velocity can be varied both lower and higher than that stipulated in the test procedure of Example 1. When the space velocity is reduced, as one might anticipate, lower light-off and hot spot temperatures are permitted, whereas at higher space velocity the temperature is increased to compensate for the leakage which would otherwise be experienced; however space velocity of 5000 hr.$^{-1}$ can be attained without exceeding a light-off temperature of 535° C. and exceeding equilibrium conditions at 2.5% $SO_2$ or 0.25% $H_2$ leakage.

In the reduction of the $SO_2$-containing gases, the oxygen content of the incoming gases should be controlled at reasonably low levels. The reason for maintaining careful control of the oxygen level is that by increasing the oxygen content, increased fuel quantity is necessary to make it possible to reduce the $SO_2$. Furthermore, if the oxygen content is excessive, a temperature control problem is experienced because of the excessive temperature rise. However, oxygen levels of up to ten percent of the $SO_2$ is satisfactory and oxygen levels as high as 20–30% of the $SO_2$ levels, if consistent, are operable within reasonable limits. The water vapor or steam content of the incoming gases is not critical relative to the reaction itself but economics are adversely affected by excess steam.

The sulfur dioxide content can be varied from that stipulated in Example 1 if appropriate compensations are made in the fuel content and the inlet gas temperature; that is, with increased $SO_2$ content the inlet temperature must be decreased but at lower $SO_2$ concentrations, the inlet gas temperature must be increased so that an adequate maximum temperature is reached. A catalyst having high efficiency for $SO_2$ removal and fuel utilization is most valuable when it has low light-off temperature.

EXAMPLE 10

A catalyst prepared as described in Example 1 is calcined for 5 hours at 850° C. The surface area of the catalyst is 96 m.$^2$/g.

This catalyst is examined under conditions described in Example 1. The high efficacy of the catalyst and high thermal stability is demonstrated by the fact that it will light off at 375° C. and reach equilibrium conditions with less than 2.4% $SO_2$ and 0.25% hydrogen in the off-gas at a hot spot temperatures equal to 575° C.

EXAMPLE 11

The catalyst of this example is prepared by first dissolving 35.5 parts by weight of ammonium molybdate in sufficient distilled water to produce 500 parts by weight of solution. A second solution is prepared comprising 52 parts by weight of anhydrous barium nitrate in sufficient distilled water to produce 500 parts by weight of total solution. With the ammonium molybdate solution at 70° C. and the barium nitrate solution also at 70° C., the latter is added to the ammonium molybdate over a period of 5 minutes. Little precipitation occurs until the solution is allowed to evaporate to approximately one-third of the total volume under which conditions a bulky precipitate forms. The precipitate is added to the ball mill as subsequently described. A second precipitate which is in this case converted to a filter cake is prepared by dissolving 50 parts by weight of mixed rare earth carbonates in an aqueous solution comprising 225 parts by weight of distilled water and 135 parts by weight of 70% nitric acid. The composition of the mixed rare earth carbonate is as follows on a carbon dioxide free basis: 2.6% ytterium, 21.7% lanthanum, 46.9% cerium, 5.8% praseodymium, 15.9% neodymium, 3.4% samarium, 2.1% gadolinium, 0.74% dysprosium and europium, holmium, erbium, thulium, ytterbium, and lutetium are all six present in less than 0.2% each. There is next added to the solution of the rare earth carbonates 42 parts by weight of chromic acid anhydride. The temperature of the solution is adjusted to 35° C., then sufficient 28% ammonium hydroxide solution is added to raise the pH to 7.2±0.1. After the final pH is reached, the slurry is agitated for 15 minutes, the precipitate is filtered and then washed with 500 parts by weight of distilled water.

A ball mill charge is made comprising 500 parts by weight of the kappa-alumina of Example 1, 750 parts by weight of distilled water and 120 parts by weight of 70% nitric acid. The ball mill is rotated for 2 hours, then is opened and the two filter cakes described above are added completely to the ball mill. The mill is rotated for 18 hours, then the mill product is removed, dried at 150° C., and finally calcined at 600° C. for 3 hours. The calcined product (containing barium molybdate and mixed rare earth chromites) is crushed and screened to produce 8–12 mesh granules. The surface area of the granular material is 110 m.$^2$/g.

The catalyst thus prepared is evaluated in the equipment and under the conditions described in Example 1. With a light-off temperature of less than 540° C., the reducing gases are utilized to the extent that less than 0.25% concentration of hydrogen is found in the off-gas and $SO_2$ is reduced to an equilibrium value of 2.2%.

EXAMPLE 12

The procedures of Example 11 are followed except that instead of using 52 parts by weight of anhydrous barium nitrate there is used 51 parts by weight of magnesium nitrate hexahydrate. This also produces a catalyst (magnesium molybdate and mixed rare earth chromites) having characteristics and performance similar to that described for the catalyst of Example 11.

EXAMPLE 13

The procedures of Example 11 are followed with the exception that instead of using 52 parts by weight of anhydrous barium nitrate there is used 57 parts by weight of strontium nitrate tetrahydrate. This product also is a catalyst (strontium, molybdate and mixed rare earth chromites) having properties and performance similar to that described for Example 11.

EXAMPLE 14

The procedures of Example 11 are followed except that in these separate additional preparations there is used, instead of the 52 parts anhydrous barium nitrate, the following parts by weight of alkaline earth salts to provide the corresponding molybdates:

(a) 37.4 parts of $Be(NO_3)_2 \cdot 3H_2O$
(b) 33.0 parts of $Ca(NO_3)_2$
(c) 37.0 parts of $Mg(NO_3)_2 \cdot 2H_2O$ In each case efficient utilization of the reducing gases is attained at light-off temperatures below 497° C.; hydrogen leakage and $SO_2$ leakage are both at equilibrium, i.e. below 0.25% for the $H_2$ and approximately 2.2% for the $SO_2$.

The procedures of Example 14 are followed for the preparation of catalysts except that instead of using 50 parts by weight of mixed rare earth carbonates there is used 103 parts of copper nitrate hexahydrate and no nitric acid. The catalysts thus produced comprise manganese or the alkaline earth molybdates individually complexed with copper chromite stabilized with kappa-alumina. These catalysts also produce results similar to those described above for the testing of the catalyst of Example 14.

Similar results can be obtained by substituting 124 parts of cobalt nitrate hexahydrate for the copper nitrate stipulated in the preceding paragraph to produce a cobalt chromite complexed catalyst.

EXAMPLE 15

The catalyst of this example is prepared by first dissolving 39.5 parts by weight of ammonium molybdate in sufficient distilled water to produce 500 parts by weight of solution. A second solution is prepared comprising 52 parts by weight of anhydrous barium nitrate in sufficient distilled water to produce 500 parts by weight of total solution. With the ammonium molybdate solution at 70° C. and the barium nitrate solution also at 70° C.

the latter is added to the ammonium molybdate over a period of 5 minutes. Precipitattion is rapid and after 30 minutes additional agitation, the precipitate is filtered and added to a ball mill of the type described and employed in Example 11.

A second precipitate is made and also converted to a filter cake by dissolving 50 parts by weight of chromic acid anhydride and 90 parts by weight of anhydrous manganese nitrate in sufficient distilled water to produce a total of 500 parts by weight. Sufficient 28% ammonium hydroxide is added to the solution while it is being rapidly agitated at 35° C. to increase the pH to 7.2±0.1. The slurry thereafter is agitated for 15 minutes, is then filtered, and washed with 500 parts by weight of distilled water. The filter cake is then also added to the ball mill.

Next, there is added to the ball mill 600 parts by weight of finely divided aluminum hydroxide available in commerce as alumina hydrate powder. The ball mill is operated for 12 hours and the mill slurry is then removed, dried, and calcined at 400° C. for 2 hours. The calcined product (containing barium molybdate and manganese chromite) is then granulated to produce 8–12 mesh granules having a surface area of 103 m.$^2$/g.

The catalyst thus prepared is evaluated in the equipment and under the conditions described in Example 1. The light-off temperature is 410° C. and the corresponding hot spot temperature is 611° C. The reducing gases are utilized to the extent that less than 0.25% $H_2$ is found in the off-gas and the $SO_2$ is reduced to the equilibrium value of 2.3%.

EXAMPLE 16

The preparative and testing procedures of Example 15 are followed with the exception that instead of using 52 parts by weight of barium nitrate there is used 51 parts by weight of magnesium nitrate hexahydrate. The remaining operations are the same and the catalyst (magnesium molybdate and manganese chromite) performs similarly to the one described in Example 15.

EXAMPLE 17

The procedures of Example 15 are followed with the exception that instead of using the 52 parts by weight of barium nitrate there is used 57 parts by weight of strontium nitrate tetrahydrate. This also produces a catalyst (strontium molybdate and manganese chromite) giving results similar to those described in Example 15.

EXAMPLE 18

The instructions of Example 15 are followed except that instead of using 52 parts by weight of barium nitrate there is used 47 parts by weight of calcium nitrate tetrahydrate. The resultant catalyst (calcium molybdate and manganese chromite) gives performance essentially identical to that described above in Example 15.

EXAMPLE 19

Barium molybdate is prepared as described in Example 15. Following the preparation of the barium molybdate and the placement of the filter cake in a ball mill of the type used in Example 15, there is prepared, a quantity of cerium chromite by the following procedure.

Fifty parts by weight of chromic acid anhydride and 132 parts by weight of cerium trinitrate trihydrate are dissolved in sufficient distilled water to produce a combined weight of salts and water of 650 parts. There is next added to this solution which is rapidly agitated at 50° C., sufficient 10% ammonium carbonate aqueous solution to raise the pH to 7.1±0.1. After the slurry has agitated for 30 minutes, following completion of the precipitation, the precipitate is filtered and this filter cake also after washing with 500 parts by weight of distilled water is added to the same ball mill as that into which the barium molybdate filter cake was added.

There is next added to the ball mill 600 parts by weight of finely divided aluminum hydroxide and 500 parts by weight of distilled water. The mill is rotated for 12 hours and then the slurry is removed, dried, and calcined for 2 hours at 550° C.

The catalyst is granulated and screened to produce 8–12 mesh granules which are tested as described in Example 1. Under the test conditions the catalyst had a light-off temperature of 442° C. and a hot spot of 632° C. The effluent gas stream contained concentrations of hydrogen below 0.25% (at equilibrium) and $SO_2$ leakage was also at equilibrium concentration of 2.3% $SO_2$.

EXAMPLE 20

The preparation and testing as described in Example 19 is repeated except that instead of using 52 parts by weight of barium nitrate there is used 51 parts by weight of magnesium nitrate hexahydrate. Testing of this catalyst (magnesium molybdate and cerium chromite) by the procedure of Example 1 reveals an activity similar to that described above for the barium molybdate preparation of Example 19.

EXAMPLE 21

The procedure of Example 19 is repeated with the exception that instead of using the 52 parts by weight of barium nitrate there is used 57 parts by weight of strontium nitrate tetrahydrate to provide a catalyst (strontium molybdate and cerium chromite) exhibiting test results similar to those for the catalyst of Example 19.

EXAMPLE 22

The procedures and testing of Example 19 are repeated with the exception that instead of using the barium nitrate there was used 47 parts by weight of calcium nitrate tetrahydrate. The resultant catalyst (calcium molybdate and cerium chromite) provides test results similar to those for the catalyst of Example 19.

What is claimed is:

1. In a process of reducing sulfur dioxide including the steps of forming a reactant gas stream comprising the sulfur dioxide and a reducing gas selected from the group consisting of reformed methane, propane, refinery waste gas, liquified petroleum gas or stream reformed naphtha and then bringing this reactant gas stream into contact with a supported catalyst; the improvement for providing substantially complete utilization of the reducing gas with more efficient reduction of the sulfur dioxide at practical space velocities and temperatures, which comprises contacting the reactant gas stream with an effective amount of a catalytic material on a support in which the catalytic material is a mixture of the following two components:
    (1) alkaline earth molybdates
    (2) a chromite selected from the group consisting of the chromites of cobalt, manganese, copper, cerium or a mixture of the rare earths containing at least 30% of cerium,
at a space velocity of at least 500 hr.$^{-1}$ and at a light-off temperature of less than 540° C.

2. The process of claim 1 wherein the catalytic material is present in an amount of from 0.02 to 50 parts by weight for each part by weight of support material.

3. The process of claim 1 wherein the support is alumina.

4. The process of claim 1 wherein the support is kappa-alumina.

5. The process of claim 1 in which the catalytic material is a mixture of calcium molybdate and cobalt chromite and the support is kappa-alumina.

References Cited

UNITED STATES PATENTS

| | | | |
|---|---|---|---|
| 2,747,968 | 5/1956 | Pigache | 23—181 X |
| 2,887,363 | 5/1959 | Viles | 23—181 |
| 3,495,941 | 2/1970 | Van Helden | 23—226 |

GEORGE O. PETERS, Primary Examiner

U.S. Cl. X.R.

423—244, 570